(12) United States Patent
Miriyala et al.

(10) Patent No.: US 8,063,782 B2
(45) Date of Patent: Nov. 22, 2011

(54) REMOTE INVENTORY OF DEVICES

(75) Inventors: Prasad Miriyala, Union City, CA (US); Chandrodaya Prasad, Sunnyvale, CA (US); Arthur G. Howarth, Orleans (CA); Roland Saville, Oakland Park, FL (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 11/656,660

(22) Filed: Jan. 22, 2007

(65) Prior Publication Data

US 2008/0177969 A1 Jul. 24, 2008

(51) Int. Cl.
*G08B 13/14* (2006.01)
*G06F 7/00* (2006.01)

(52) U.S. Cl. .................. 340/572.1; 700/215; 235/385

(58) Field of Classification Search .............. 340/572.1, 340/572.4, 539.13, 5.92; 235/375–385; 700/215, 700/221–229; 705/22, 28, 29
See application file for complete search history.

(56) References Cited

U.S. PATENT DOCUMENTS

| | | | | |
|---|---|---|---|---|
| 5,774,876 | A * | 6/1998 | Woolley et al. ................ 705/28 |
| 6,249,227 | B1 * | 6/2001 | Brady et al. ................ 340/572.1 |
| 6,401,157 | B1 * | 6/2002 | Nguyen et al. ................ 710/302 |
| 6,509,828 | B2 * | 1/2003 | Bolavage et al. ............ 340/10.1 |
| 6,903,360 | B2 * | 6/2005 | McAuliffe ................ 250/559.4 |
| 6,970,518 | B2 * | 11/2005 | Kuffner et al. ................ 375/259 |
| 7,202,790 | B2 * | 4/2007 | Copeland et al. ........... 340/572.7 |
| 7,212,116 | B2 * | 5/2007 | Wang et al. .................... 340/571 |
| 7,215,042 | B2 * | 5/2007 | Yan ............................... 307/116 |
| 7,219,834 | B2 | 5/2007 | Chang |
| 7,280,833 | B2 * | 10/2007 | Suda et al. ..................... 455/445 |
| 7,323,992 | B2 * | 1/2008 | Doan et al. ................. 340/572.4 |
| 7,394,372 | B2 * | 7/2008 | Gloekler et al. ........... 340/572.1 |
| 2002/0190845 | A1 | 12/2002 | Moore |
| 2005/0156711 | A1 * | 7/2005 | Aljadeff et al. ............ 340/10.34 |
| 2005/0197844 | A1 | 9/2005 | Ng et al. |
| 2005/0207381 | A1 * | 9/2005 | Aljadeff et al. ............... 370/338 |
| 2007/0222597 | A1 | 9/2007 | Tourilhes et al. |
| 2008/0204232 | A1 | 8/2008 | Agrawal et al. |
| 2009/0091442 | A1 | 4/2009 | Howarth et al. |

OTHER PUBLICATIONS

Cisco Systems White Paper, "Benefits of Deploying Cisco Unified Communications Within a Cisco Intelligent Network," Sep. 2006, 17 pp.
US Non-Final Office Action dated Jul. 8, 2010, from related U.S. Appl. No. 11/867,623.

\* cited by examiner

*Primary Examiner* — Benjamin C Lee
*Assistant Examiner* — Sigmund Tang
(74) *Attorney, Agent, or Firm* — Weaver Austin Villeneuve & Sampson LLP (57) ABSTRACT

Mechanisms are provided to inventory groupings of components, e.g., the physical chassis of a networking device as well as the various cards, modules, and/or blades inserted within the chassis. The inventory may be performed remotely. Some implementations also provide mechanisms to determine remotely the physical location of the asset. Preferred implementations of the invention can provide such functionality regardless of whether a main power supply of the physical device is on or off. Some embodiments of the invention employ radio frequency identification ("RFID") technology.

36 Claims, 11 Drawing Sheets

REMOTE INVENTORY OF DEVICES

BACKGROUND OF THE INVENTION

1. Field of the Invention

The present invention relates to inventory devices and methods.

2. Description of the Related Art

Identifying and locating devices within a company can be a time consuming, expensive task. For example, inventorying physical networking assets includes not only the identification of the manufacturer, model number, and serial number of chassis based devices, but also the identification of the internal modules, blades, and/or daughter boards within those devices.

Maintenance and service contracts rely on an accurate assessment of physical networking assets deployed. Mistakes in inventorying such physical assets can cause the wrong part to be shipped in the event of a component failure. This can lead to extended downtime of the network resource, missed service level agreements, as well as additional shipping and labor costs. Companies expend additional operating expenses in renewing maintenance contracts on networking equipment that has been retired, lost, or replaced, because its current status is unknown.

Due to similar issues, companies spend capital resources for networking equipment they already possess, but cannot locate or do not know exists. These additional capital expenditures increase depreciation costs and decrease free capital for other projects. Newer inventory may be received and then deployed before the older inventory is deployed. The older inventory may become obsolete before being deployed and utilized productively within a company. It would be desirable to address at least some of these shortcomings of the prior art.

DESCRIPTION OF EXAMPLE EMBODIMENTS

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Various techniques and mechanisms of the present invention will sometimes be shown and/or described in singular form for clarity. However, it should be noted that some embodiments may include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted.

Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection that is illustrated and/or described does not necessarily mean a direct, unimpeded connection unless otherwise noted.

Although the present invention involves methods and devices for locating, identifying and inventorying network devices and their components, many aspects of the present invention can be applied to locating, identifying and inventorying other types of devices, including wireless and wired devices, in other types of networks. For example, the present invention may also be used for locating, identifying and inventorying consumer electronic devices, personal computing devices, telephony devices, etc.

Accordingly, the methods and devices of the present invention have very broad utility, both in the public and private sectors. Any enterprise needs to keep track of how its equipment is being deployed, whether that equipment is used for commercial purposes, for military purposes, etc. Devices that are located, identified and inventoried according to the present invention can provide necessary information for allowing enterprises to track equipment and products (or groups of products). Information provided according to the present invention will be of great benefit for enterprise resource planning, including the planning of manufacturing, distribution, sales and marketing.

Overview

Networking assets deployed by a company can currently be identified and located if they are powered on and connected to the network. This can be accomplished via connecting to the device directly or over an IP-based network and requesting such information. For example, Cisco has developed software that allows such identification, e.g., via a "show diag" command to a network device that is powered on and connected to a network. A company may also use other mechanisms utilizing the Simple Network Management Protocol ("SNMP") to inventory networking devices that are powered on and connected to a network. Real Time Location Systems ("RTLS") may be used to track and identify the location of objects, such as automobiles, in real time.

When networking equipment is installed but powered off, or when networking equipment is stored at third party integrator or customer warehousing sites prior to deployment within a network, no remote mechanism previously existed to inventory such assets. Inventorying of such equipment was performed by matching purchase orders with physical boxes and by manually opening boxes and/or chassis devices to read part and serial numbers. Each component of the device (e.g., each card, power supply, etc.) would need to be evaluated, possibly removed, scrutinized and compared with a component inventory sheet in order to determine whether all of the proper components were present. This method was highly expensive, time consuming, and error prone.

Various improvements over such techniques are provided herein. Some implementations of the present invention provide mechanisms to inventory remotely the physical chassis of a networking device as well as the various cards, modules, and/or blades inserted within the chassis. Some implementations also provide mechanisms to remotely determine the physical location of the asset. Preferred implementations of the invention can provide such functionality regardless of whether a main power supply of the physical device is on or off.

Some embodiments described herein provide an apparatus that includes the following elements: a support structure; means for communicating with a network; a plurality of components disposed within the support structure, each component having an associated radio frequency identification ("RFID") tag; and an RFID reader. The RFID reader preferably has a read range approximately corresponding with a volume of the support structure and is configured to do the following: read the RFID tag associated with each of the plurality of components; aggregate component information from tag reads; and transmit aggregated component information via the network interface.

In some such embodiments, the support structure may be a device chassis. However, in other embodiments, the support structure may be a box containing the components.

The apparatus may include a non-volatile memory. The RFID reader may be configured to store component information in the non-volatile memory. The apparatus may include means for indicating whether a component was previously detected when the apparatus was powered on, e.g., by reference to the non-volatile memory and/or to a memory of a device motherboard.

The operating frequency of the RFID tags and/or the RFID reader may be selected for short-range operation. The RFID reader may comprise a Class IV or Class V RFID tag, e.g., an RFID aggregation tag.

The means for communicating with a network may comprise a wireless interface. Alternatively, or additionally, the means for communicating with a network may comprise an active or passive RFID tag.

The apparatus may include a main power supply and a battery backup system. The battery backup system may be configured for powering the RFID reader when the main power supply is off. The battery backup system may be configured to recharge from the main power supply.

Another apparatus described herein includes the following elements: a support structure; a plurality of components disposed within the support structure; a first non-volatile memory; a processor configured for communication with the plurality of components and configured to store component data regarding the plurality of components in the first non-volatile memory; means for communicating with a network; and an aggregation device configured for communication with the first non-volatile memory. The aggregation device may be configured to receive component data from the first non-volatile memory, aggregate the component data and transmit aggregated component data via the network interface.

The apparatus may include a motherboard, e.g., disposed within the support structure. The processor may be disposed on the motherboard. The first non-volatile memory may comprise a motherboard memory.

The apparatus may include a second non-volatile memory. The aggregation device may be configured to store component data in the second non-volatile memory.

In some embodiments, the aggregation device may comprise an aggregation tag. The means for communicating with a network may comprise a wired or a wireless interface. The means for communicating with a network may comprise an active or a passive RFID tag.

Another apparatus described herein includes these elements: a support structure; a plurality of components disposed within the support structure; means for communicating with a network; and an aggregation device configured for communication with the plurality of components. The aggregation device may be configured to query each of the plurality of components, aggregate the component data and transmit aggregated component data via the network interface. The aggregation device may be configured for communication with the plurality of components via hardware connections or via wireless interfaces.

The apparatus may include a non-volatile memory. The aggregation device may be configured to store component data regarding the plurality of components in the non-volatile memory.

The aggregation device may be further configured to detect a configuration change and to query each of the plurality of components when a configuration change is detected. The aggregation device may comprise an aggregation tag.

The means for communicating with a network may comprise a wireless interface, e.g., an interface configured for communication via one of the IEEE 802.11 standards. The means for communicating with a network may comprise an active or a passive RFID tag.

The apparatus may have a main power supply and a battery backup system for powering the aggregation device when other parts of the apparatus are powered down. The battery backup system may be configured to recharge from the main power supply.

RFID

Some embodiments of the invention employ radio frequency identification ("RFID") technology. Alternative technologies, including Bluetooth™, near-field communications (e.g., near-field magnetics), sensor networks and others not mentioned herein may also be used to gather information from components. Although the cost of such technologies makes these embodiments less desirable at present, within the foreseeable future such embodiments may prove to be cost-effective.

Figure 1:
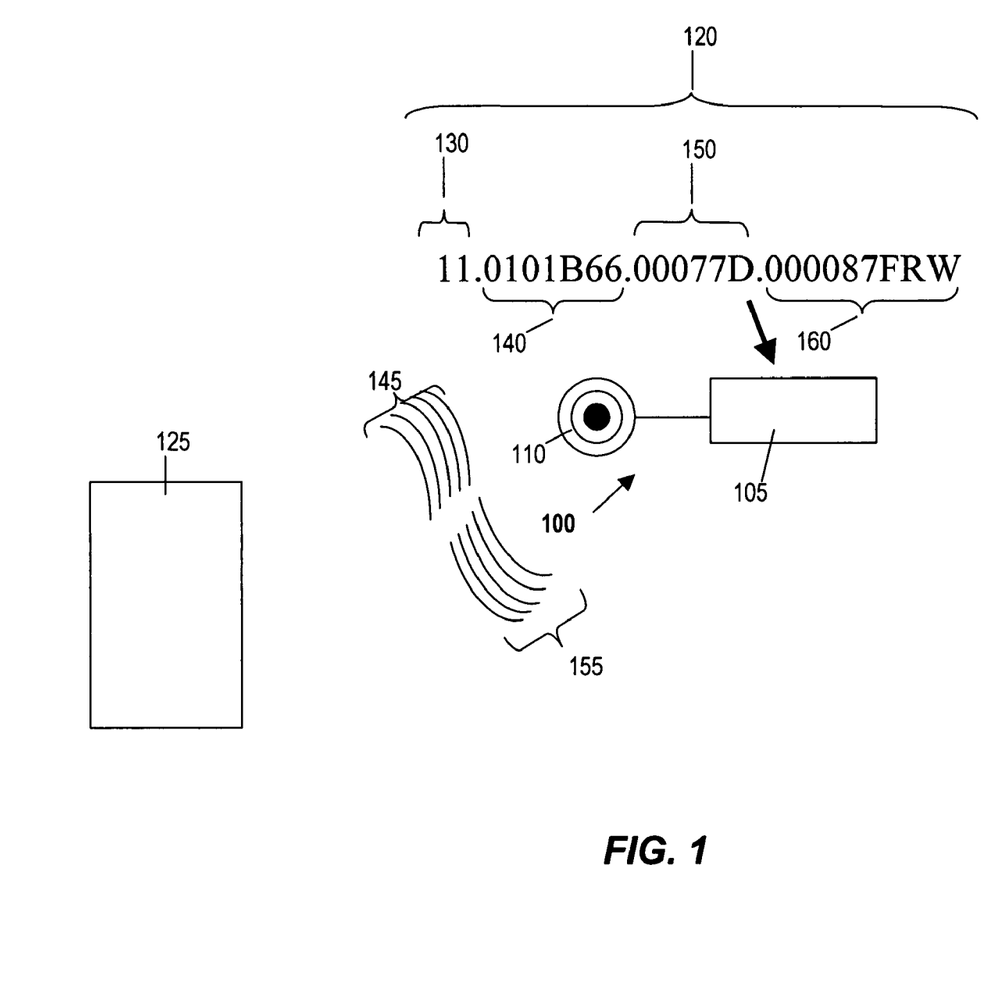
FIG. 1 is a diagram illustrating a radio frequency identification ("RFID") tag.

As shown in FIG. 1, an RFID tag 100 includes microprocessor 105 and antenna 110. In this example, RFID tag 100 is a "passive" RFID tag that is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

Most RFID tags use one of the Electronic Product Code ("EPC" or "ePC") formats for encoding information. EPC codes may be formed in various lengths (common formats are 64, 96 and 128 bits) and have various types of defined fields, which allow for identification of, e.g., individual products as well as associated information. These formats are defined in various documents in the public domain. One such document is EPC Tag Data Standards Version 1.1 Rev 1.24, published by EPCglobal® in 2004. EPCglobal® is a joint venture between GS1 (formerly known as EAN International) and GS1 US™ (formerly the Uniform Code Council, Inc.). EPCglobal® is an organization set up to achieve world-wide adoption and standardization of EPC technology.

One example of an RFID tag format is shown in FIG. 1. Here, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

Active RFID tags have their own battery and can transmit at higher power levels than passive tags. Therefore, active RFID tags may be more effective in environments that are challenging for RF operation, such as those including metal (e.g., device chassis, shipping containers, etc.). Active RFID tags can transmit signals over relatively longer distances than passive RFID tags: some active tags have practical ranges of hundreds of meters.

Some active RFID tags, known as Class IV and Class V RFID tags, have additional capabilities. Class IV RFID tags may be configured for communication with other active RFID tags as well as with RFID readers. Some Class IV RFID tags may be configured for broad-band communication. Class V RFID tags are essentially readers with extended functionality. Class V RFID tags can power passive RFID tags and can communicate with readers, Class IV RFID tags and other Class V RFID tags.

Some active RFID tags may be configured as read/write RFID tags, which can capture information regarding the history of products or groups of products, e.g., component changes, temperature and other environmental changes, stresses, accelerations and/or vibrations that have acted upon the product. It can be particularly useful to record such information for products that are relatively valuable and/or more subject to theft, spoilage or other damage, such as perishable foods and fragile items.

Some methods of the present invention can be used to provide information to update databases maintained by various entities (e.g., manufacturers, wholesalers, retailers, transportation companies and financial institutions). The information can be used not only to keep track of inventory, but also to resolve disputes (for example, regarding responsibility for product damage) to increase customer satisfaction, to avoid health risks, etc.

Collecting and Aggregating Information Regarding Components Within a Support Structure Various examples of mechanisms are presented herein for the collection and aggregation of information regarding components within a support structure. In some implementations, the components may be the cards, modules, and/or blades of a network device. The support structure may be the chassis of the network device. However, in some implementations, the support structure may be a box, a package or another container within which various components are contained. Moreover, all components are not necessarily inside the support structure; one or more components may be, e.g., attached to the outside of the support structure, not attached to the support structure but nearby, etc. For example, there may be additional components of interest that are shipped with a device having a chassis and various components within the chassis, but the additional components may be outside the chassis.

RFID Tags Attached to Components Within the Support Structure

Figure 2A:
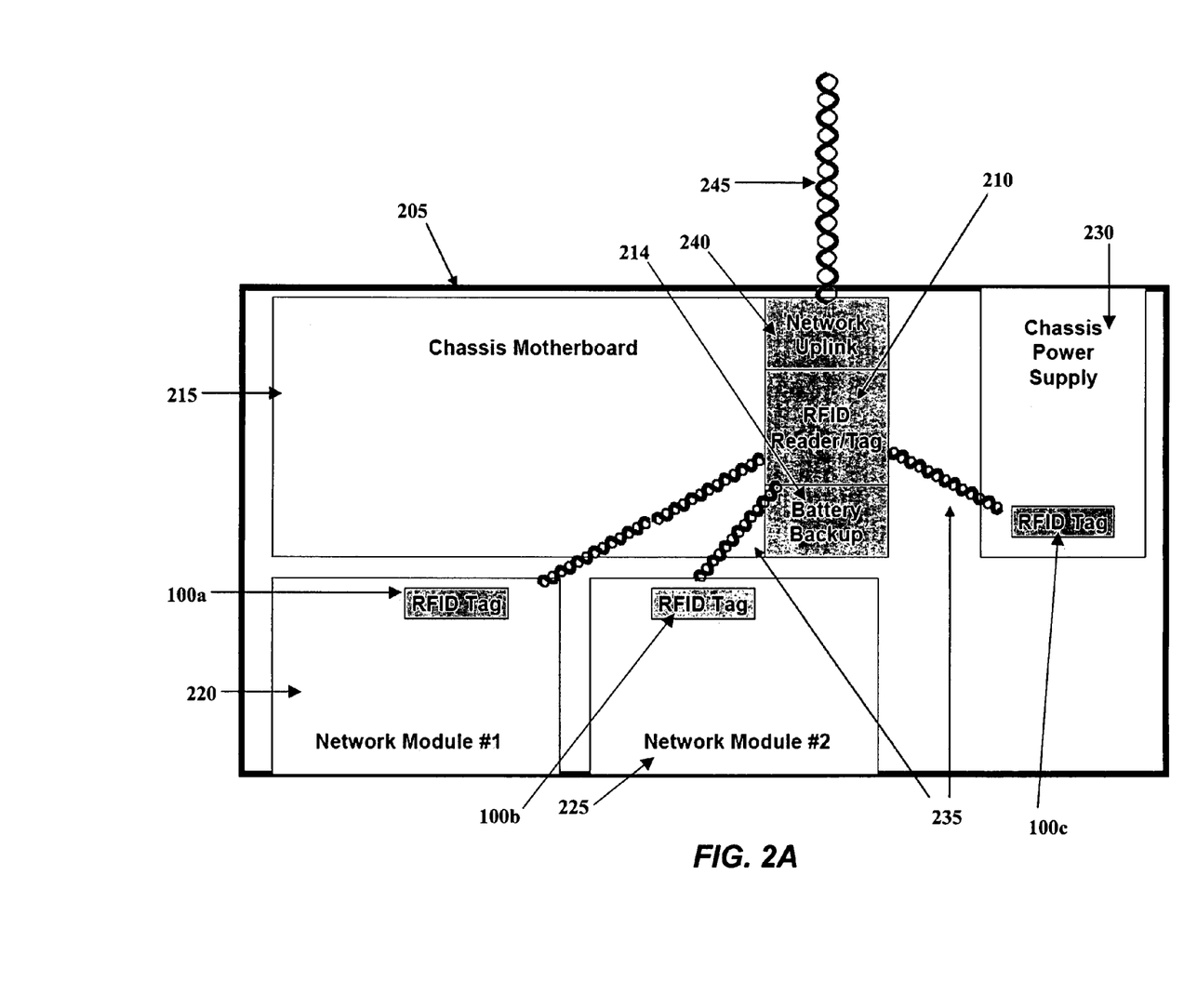
FIG. 2A illustrates an example of a device that may be configured to perform remote inventory functions.

In some examples, RFID tags may be attached to various components of interest within (or near) a support structure. FIG. 2A illustrates one such example. Here, within device chassis 205, each module, daughterboard, blade, power supply, and all other components of interest to inventory management have an associated RFID tag. The RFID tag may be a passive or an active RFID tag.

In this example, passive RFID tag 100a is attached to module 220, passive RFID tag 100b is attached to module 225 and passive RFID tag 100c is attached to power supply 230. Each of the RFID tags includes information regarding the associated component, e.g., the specific instance of the associated component, including a specific serial number of a make and model. The RFID tag may include more detailed information regarding the component's features, specifications, etc. Alternatively, or additionally, the RFID tag may reference more detailed information that is stored in an associated database.

If a component has sub-components of value or interest, the RFID tag of a component may identify the sub-components. In some implementations, some or all of the sub-components may also have associated RFID tags that include information regarding the sub-components.

In some implementations RFID reader 210 comprises a miniature RFID reader, which may be provided in a format similar to that of existing Personal Computer Memory Card International Association ("PCMCIA") form factors. Alternatively, RFID reader 210 may comprise a tag similar to an EPCglobal® Class IV tag. RFID reader 210 is preferably configured for communication with motherboard 215, and may be connected to (or even embedded within) the motherboard.

RFID reader 210 is configured for communication with one or more devices outside of device chassis 205 via network uplink 240. Network uplink 240 may be, for example, a radio frequency uplink, a wireless uplink (e.g., according to one of the Institute of Electrical and Electronics Engineers' ["IEEE"] 802.11 standards), depending on the desired implementation. In some implementations, network uplink 240 comprises one or more active or passive RFID tags associated with RFID reader 210.

As described in more detail elsewhere herein, RFID reader 210 collects and aggregates information from the RFID tags associated with each component (e.g., each daughterboard, blade, power supply, etc.) that is of interest for inventory management. This component information is transmitted to one or more other devices (e.g., other RFID readers, wireless access points, network devices, host devices, etc.) via network uplink 240. RFID reader 210 preferably stores component information within a non-volatile memory of the RFID reader/aggregation tag (e.g., in a memory similar to non-volatile random access memory ["NVRAM"] 310, shown in FIG. 3A).

It is preferable that the read range should be sufficient to read the RFID tags associated with all components within the support structure and any associated components that may be near the support structure. However, it is also preferable that the read range does not extend far beyond the volume of the support structure in order to avoid reading RFID tags of unrelated components in or near other support structures. In this example, the components of interest are all within chassis 205, so it is desirable that the read volume is large enough to read the RFID tags associated with all components within chassis 205, but is not so large as to read RFID tags associated with components within another chassis.

Accordingly, the particular operating frequency of the RFID tags and/or the antenna gain of RFID reader 210 may be chosen for short-range operation, such that the read volume is the approximate volume of the support structure, e.g., the approximate volume of chassis 205. For example, the operating frequency may be low frequency ("LF"), high frequency ("HF"), ultra-high frequency ("UHF"), etc.)

If network uplink 240 comprises a radio frequency communication link, that link is preferably configured for relatively longer-range communication. However, the communication range may be selected according to the implementation: in some implementations it may be desirable for network uplink 240 to have a relatively short communication range. For example, if many chassis 205 are disposed near one another (e.g., in a warehouse), it may be desirable for network uplink 240 to transmit signals only a relatively short distance, e.g., a few meters.

RFID reader 210 preferably includes its own power supply (here, battery backup 214) to enable RFID reader 210 to operate at times when chassis power supply 230 is switched off. Accordingly, battery backup 214 provides the necessary power to periodically activate RFID reader 210 in order to read nearby RFID tags. Additionally, battery backup 214 provides the necessary power to periodically transmit the aggregated information via the uplink and/or respond to a query for aggregated information from an external device. The capacity of battery backup 214 is preferably such that RFID reader 210 can remain un-powered for months at a time and still be able to carry out its function of collecting and sending aggregated inventory information when appropriate.

Here, battery backup system 214 is configured to recharge from chassis power supply 230 when chassis power supply 230 is switched on. When chassis power supply 230 is on, RFID reader 210 may be powered from chassis power supply 230 directly off the main power supply of the device, or from battery backup system 214.

Figure 2B:
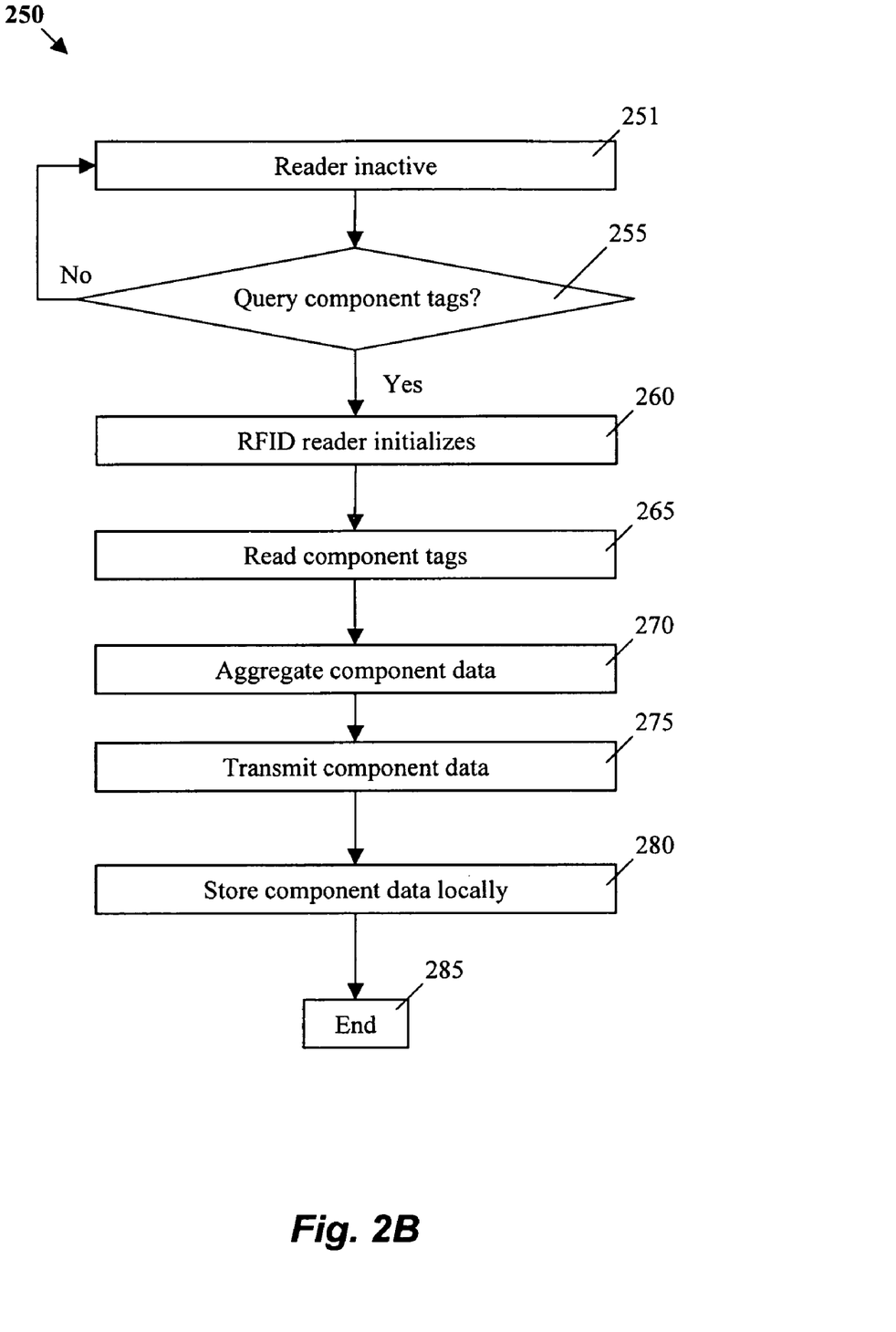
FIG. 2B is a flow chart that outlines a process that the device of FIG. 2A may perform.

A method 250 of operating RFID reader 210 is outlined the flow chart of FIG. 2B. The steps of the methods discussed herein, including but not limited to method 250, need not be performed (and in some implementations are not performed) in the order shown. Moreover, some implementations of the methods discussed herein may include more or fewer steps than those shown or described.

In step 251, part or all of RFID reader 210 is inactive. In some implementations, the antenna portion of the reader is inactive, but one or more logic devices (e.g., processors), timers, etc., are active.

In step 255, RFID reader 210 determines whether to query RFID tags associated with components. RFID reader 210 may make this determination in various ways, according to the implementation. For example, RFID reader 210 may make the determination of step 255 in response to an indication that a predetermined period of time has elapsed. In such examples, RFID reader 210 may receive the indication from another device, from its own timer, etc. The predetermined period of time may be, for example, defined by a factory default, but is preferably configurable by a customer, network manager, etc. For example, the period of time may be configured when the chassis is powered on. Alternatively, the period of time may be remotely configurable according to commands received via a network interface. In some examples, predetermined period of time may be based upon the expected life of battery backup 214 when the device is un-powered.

However, RFID reader 210 may make the determination of step 255 in alternative ways. For example, RFID reader 210 may make the determination in response to a signal from another device, e.g., an RF signal, a wireless signal, a near-field magnetic signal, etc. RFID reader 210 may receive the signal via network uplink 240 or via another interface.

If it is time to query the components' RFID tags, RFID reader 210 initializes (step 260) and reads the component tags. (Step 265.) RFID reader 210 collects and aggregates component data from all tags within the chassis. (Step 270.) In some implementations, the component data include information obtained from motherboard 215, e.g., as described below.

The component data may include, but is not limited to, the component's manufacturer, the component's model name and/or number and; the component's serial number. The component data may comprise a Unique Identifier (UID), (e.g., similar to a Serialized General Trade Item Number ["SG-TIN"] code as defined by EPCGlobal®) which can be used in place of the manufacturer, model number and serial number. The values corresponding to the UID can be assigned by the manufacturer and may be used, e.g., where security concerns make it inadvisable to disclose the manufacturer, model number and serial number. In some such implementations, the transmission of the correlation of the UID to manufacturer, model number and serial number may be done via secure mechanisms, such as online query by the end-customer after authentication by the manufacturer.

Optionally, additional information may indicate whether the particular component is a "known" component that was identified (e.g., by the firmware of the device) when chassis power supply 230 was last powered on. This information may be obtained, for example, from a non-volatile memory of RFID reader 210, of motherboard 215, etc. A logic device (e.g., of RFID reader 210, of motherboard 215, of another device that receives the data via network uplink 240) may compare the components detected in step 265 and the "known" components in order to determine whether any new or different components have been detected in step 265.

In some instances, RFID reader 210 will detect the RFID tags of components other than known components in step 265. Identifying such previously unknown components can reduce the possibility that a spurious tag read from a component within another chassis is attributed to chassis 205. On the other hand, if RFID reader 210 does not detect a known component in step 265, the process may also indicate that an existing component has been removed from chassis 205, or that the component is still within chassis 205 but that RFID reader 210 did not successfully read its RFID tag.

When chassis power supply 230 is powered on, additional information may indicate whether the component is currently powered on and "seen" by the firmware of the device. Comparing the components detected in step 265 with those identified can be useful for correlation between existing online mechanisms for inventory management and/or failure identification of a particular module.

In step 275, the aggregated component data are transmitted via network uplink 240. If comparisons such as those previously mentioned (e.g., comparing known components with components whose RFID tags are read in step 265) are performed locally, some implementations of the invention involve filtering the component data before transmission. For example, a local logic device may filter component data according to a predetermined rule set designed to detect tag reads from nearby chassis. In one such example, if RFID reader 210 detects 3 chassis power supplies 230, but only one is a known component, the RFID tag reads from the other two power supplies may be filtered out prior to transmission. Alternatively, or additionally, another device (such as an RFID middleware server) may provide such filtering.

In some implementations, component data are transmitted only when indicated, e.g., in response to a query from another device, after a predetermined time has elapsed, etc. Preferably, at least some of the component data are stored in a local non-volatile memory. (Step 280.)

Obtaining Component Data from a Local Memory

Instead of, or in addition to, obtaining component data via reading RFID tags or the like, some implementations of the invention involve obtaining component data from a local memory that may not be associated with an RFID reader or other aggregation device. Many devices from manufacturers are bench tested with their current configurations before being shipped to customers; these current configurations may be stored in a non-volatile memory. Accordingly, if there is no subsequent modification of components, inventory can be accurately assessed, e.g., for devices that are stored within boxes in warehouse-type environments.

Figure 3A:
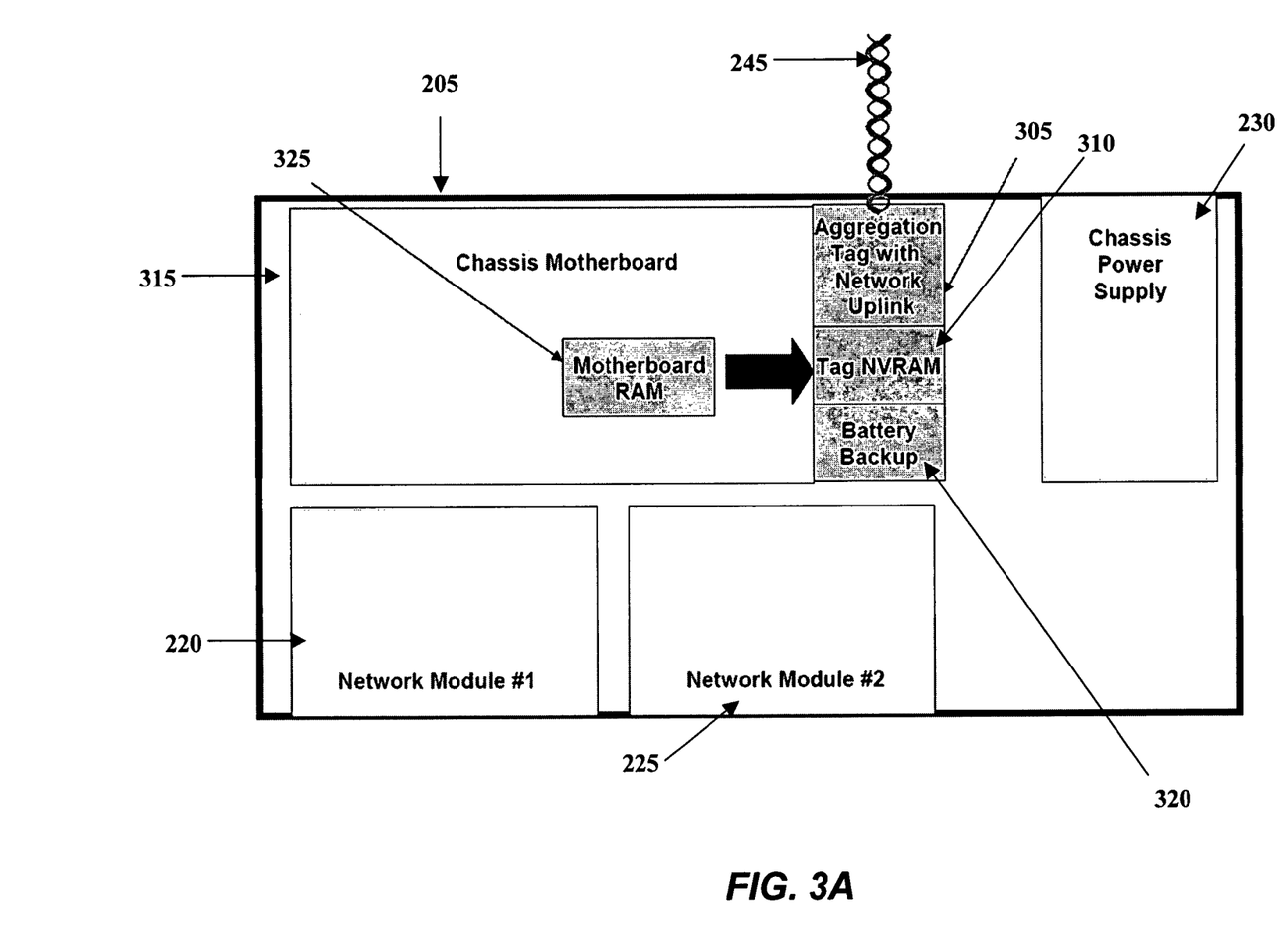
FIG. 3A illustrates an example of another device that may be configured to perform remote inventory functions.

One example of obtaining component data from a local memory will now be described with reference to FIG. 3A. When chassis power supply 230 is on, chassis motherboard 315 is configured to collect information regarding the various cards, modules, blades and/or other components that are in communication with chassis motherboard 315. Here, chassis motherboard 315 is configured to collect information regarding network modules 220 and 225, chassis power supply 230 and other components (not shown), and to store this component information in RAM 325.

Aggregation device 305 collects and aggregates component information directly from RAM 325 when chassis power supply 230 is powered on. Aggregation device 305 may comprise an aggregation tag, similar to an EPCglobal® Class IV tag. However, aggregation device 305 does not necessarily comprise an aggregation tag or any type of tag. More generally, aggregation device 305 may comprise one or more logic devices configured to perform functions such as those described herein, associated memory, one or more network interfaces, etc. Aggregation device 305 is configured for communication with RAM 325 via a wired or wireless connection. In some embodiments, aggregation device 305 is connected to motherboard 315 and may be embedded within motherboard 315.

Figure 3B:
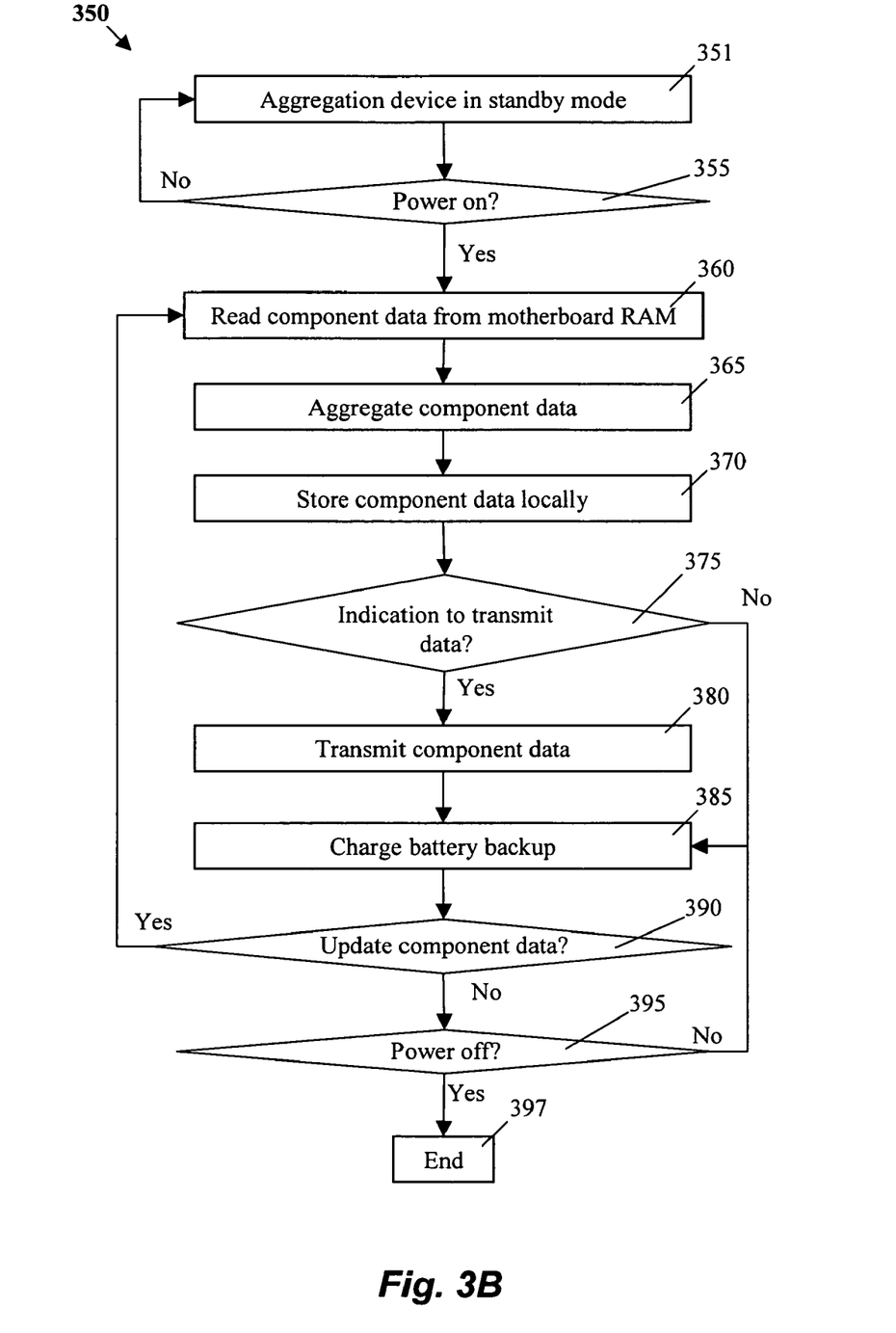
FIG. 3B is a flow chart that outlines a process that the device of FIG. 3A may perform.

FIG. 3B is a flow chart that describes functions that may be performed by aggregation device 305 and related devices. In this example, aggregation device 305 is in standby mode (step 351) until chassis power supply 230 is switched on. (Step 355.) Preferably, aggregation device 305 is still able to provide component data when indicated (e.g., in response to a query from another device, after a predetermined time has elapsed, etc.) when chassis power supply 230 is switched off, because aggregation device 305 can be powered by battery backup 320. In some implementations, the components of aggregation device 305 that perform steps of method 350 may be inactive, but other components may be active. For example, one or more logic devices (e.g., processors), timers, etc., may be active.

When chassis power supply 230 is switched on, aggregation device 305 reads component data from RAM 325 (step 360), aggregates these data, if necessary (step 365) and stores the component data in NVRAM 310. (Step 370.)

In step 375, it is determined whether there is an indication to transmit component data via an network uplink of aggregation device 305. If so, these data are transmitted (step 380). For example, aggregation device 305 may determine whether there has been a query for component data from another device. Aggregation device 305 may determine whether a predetermined time until a planned transmission has elapsed. In some implementations, aggregation device 305 will transmit component data whenever they are received from motherboard RAM 325. Even when chassis power supply 230 is subsequently powered off, aggregation device 305 has stored the last known configuration of the device and can provide component data when indicated. In this example, battery backup 385 charges while chassis power supply 230 is powered on. (Step 385.)

If there is an indication that component data have been updated (step 390), aggregation device 305 reads the updated component data from motherboard RAM 325. (Step 360.) For example, a motherboard CPU may be configured to send a signal to aggregation device 305 when motherboard RAM 325 indicates a new component, that a component has been removed, etc. In some such implementations, any warm configuration changes to the device will also automatically update motherboard RAM 325, triggering aggregation device 305 to again query motherboard RAM 325.

Collecting Component Data from Hardware Connections

One drawback of collecting component data only from motherboard RAM 325 is that components may be changed when a chassis power supply 230 is off. In such cases, when aggregation device 305 subsequently transmits component data, the component data would not indicate the change in configuration. As noted above, some implementations overcome this problem by collecting component data from motherboard RAM 325 and other sources, e.g., RFID tags, sensors, etc. on each component of interest.

Figure 4:
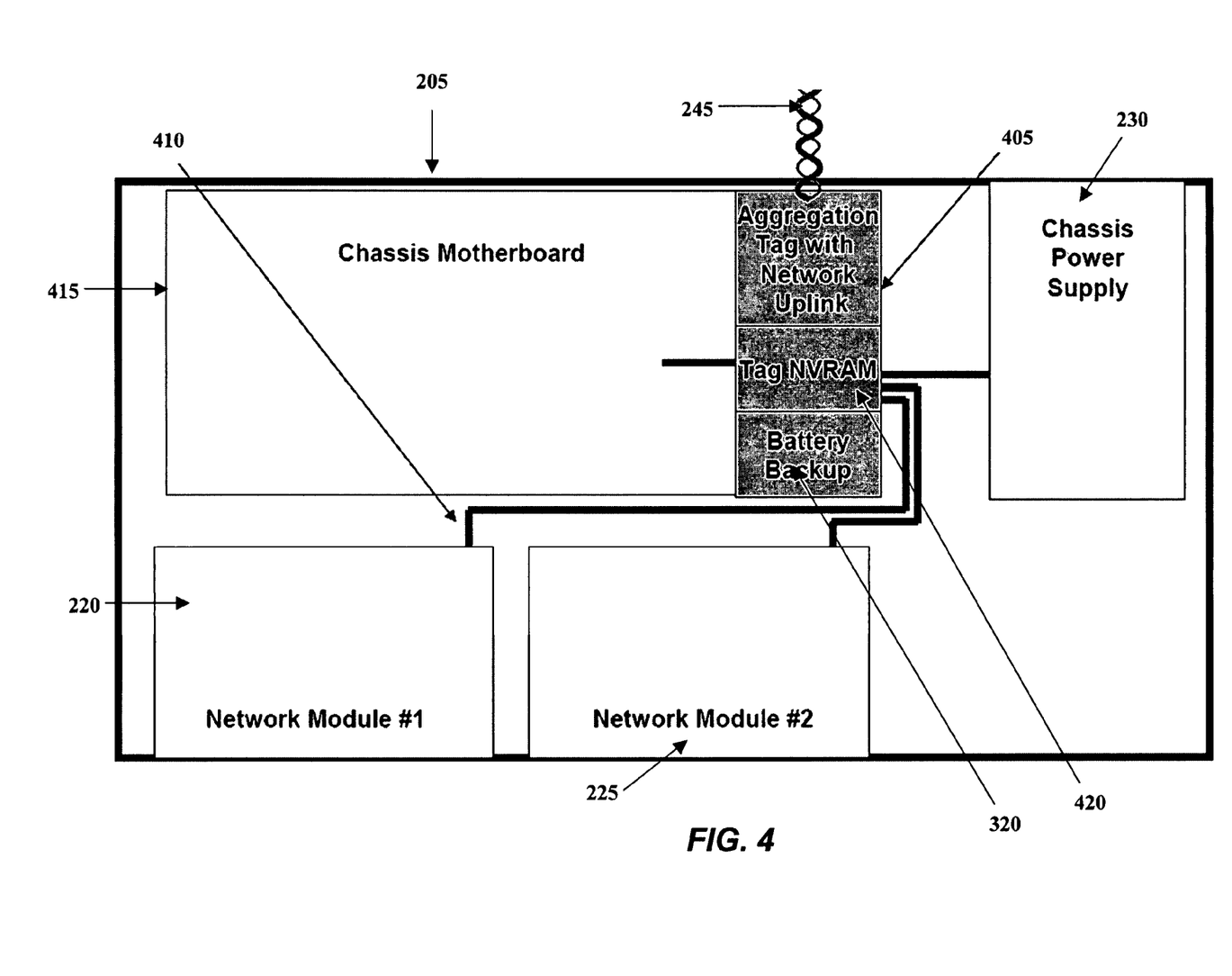
FIG. 4 illustrates an example of another device that may be configured to perform remote inventory functions.

In alternative embodiments, hardware connections are disposed between components and an aggregation device in order to overcome this issue. One such embodiment is illustrated in FIG. 4. In this example, hardware connections 410 are made from aggregation device 405 to every component of interest within chassis 205, including modules 220 and 225, chassis power supply 230 and motherboard 415. Hardware connections 410 may comprise pins, for example. Via hardware connections 410, aggregation device 405 collects and aggregates information directly from each component of interest within chassis 205. When a component is removed, the corresponding hardware connection 410 is broken, so aggregation device 405 is aware of the removed component. The component information is then stored within NVRAM 420.

Battery backup system provides power to aggregation device 405 when chassis power supply 230 is powered off. Regardless of whether chassis power supply 230 is powered on or off, aggregation device 405 can collect data directly from hardware connections 410, store the current configuration of the device in NVRAM 420 and provide component data via a network uplink when indicated.

Transmitting Inventory Information Across a Network

Figure 5:
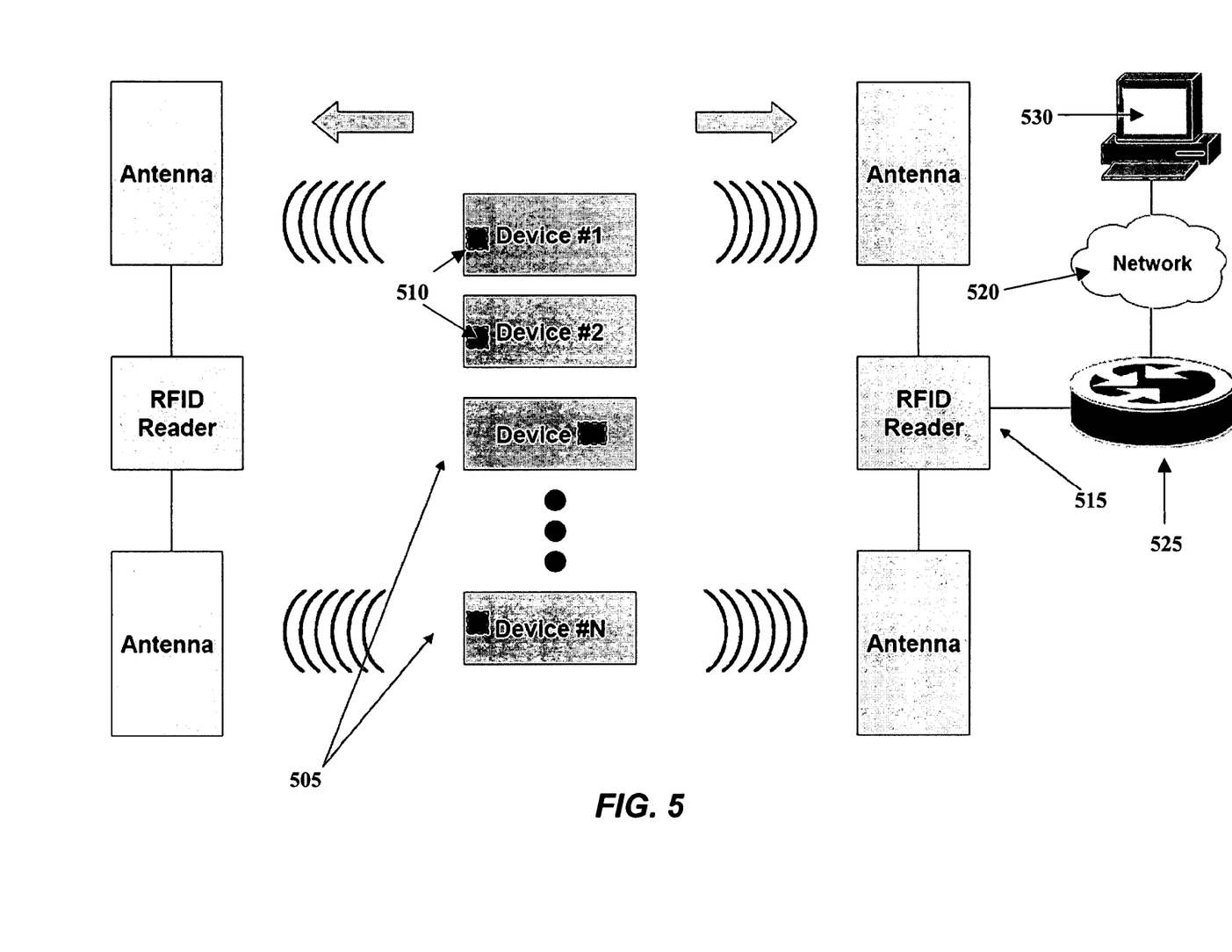
FIG. 5 is a network diagram that illustrates the uplink of inventory data via RFID.
Figure 6A:
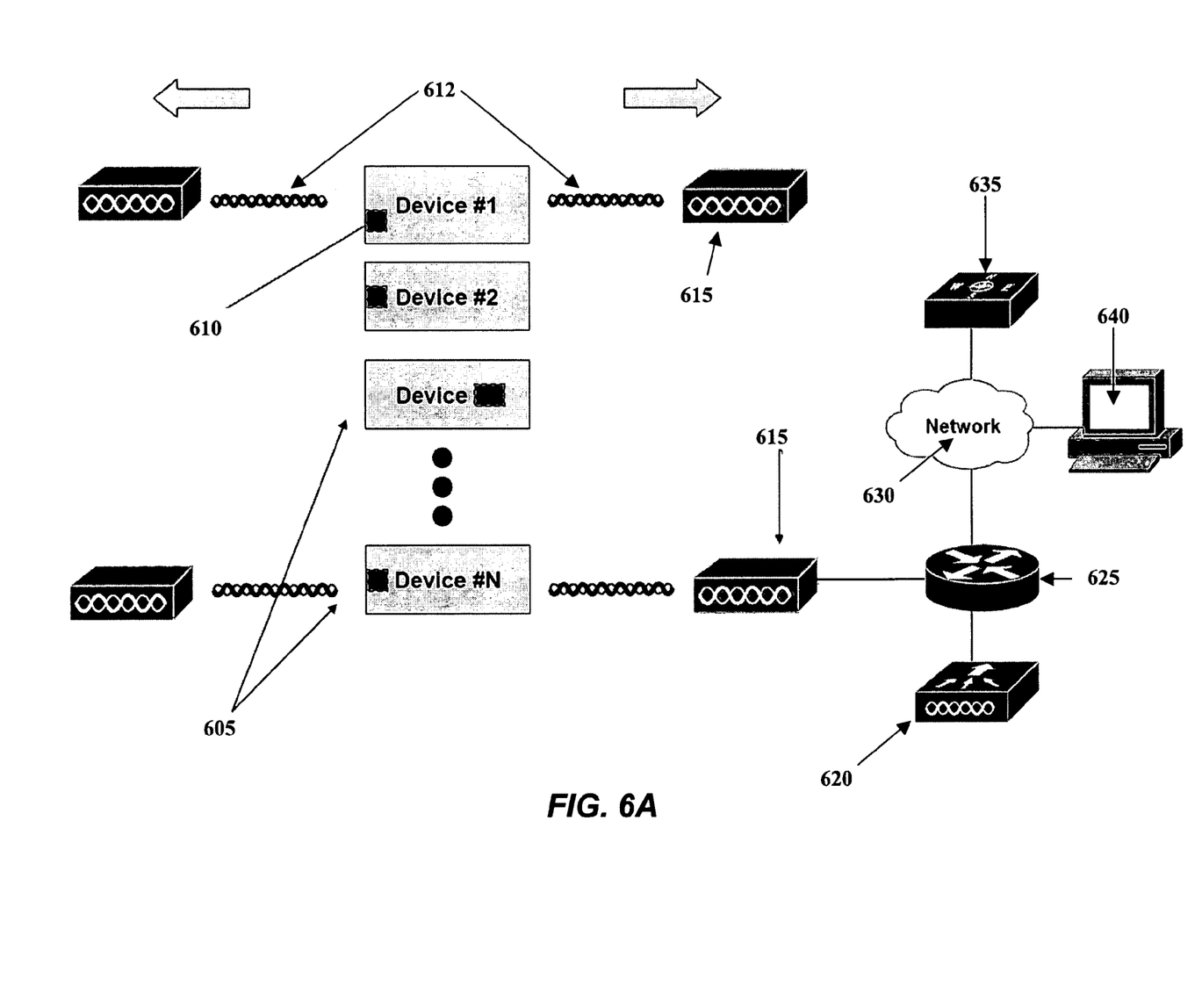
FIG. 6A is a network diagram that illustrates the uplink of inventory data via 802.11 technology.

FIGS. 5 and 6 show two examples of networks for transmitting aggregated inventory information to application servers and other devices in a network. In the example depicted in FIG. 5, the uplink is implemented via RFID technology, using passive or active RFID tags, or a combination thereof. If RFID tags 510 are active RFID tags, RFID readers 515 can reliably receive RF signals at a relatively greater distance, e.g. on the order of 100 meters or more. For example, relatively fewer RFID readers 515 may be strategically placed within storage rooms, warehouses, equipment labs, data center locations, etc. As described elsewhere herein, readers 515 may periodically query the devices 515 via RFID tags 510. Devices 505 may respond with aggregated component data, preferably utilizing a battery backup system to power the responding devices (e.g., the aggregation devices and/or active RFID tags) when the main power supplies of the devices are off.

Utilizing passive RFID technology, readers 515 would need to be placed in closer proximity to passive RFID tags 510, possibly within 5 meters or less given the current state of passive RFID technology. However, the uplink operation may be similar. Readers may periodically query the network device, which can respond with the aggregated data. However, a battery backup system is not utilized to power passive RFID tags 510. Instead, the RF energy from the external reader is used.

In both such scenarios, the physical location of the device can be determined by the RFID reader antenna that received the aggregated data. Network devices 525 convey the component data via network 520 to other devices, such as host device 530 of an inventory management system. In this example, network 520 is an IP-based network, but network 520 may be any convenient type of network. Some network devices 525 may be switches, RFID middleware servers and other such devices. In one such example, one or more middleware servers are implemented via the Cisco AON™ for RFID solution running on a network device such as a router.

Some such network devices 525 can explicitly add detailed location or other information to the component data. In some examples, the information may be added in the form of "ECReports": an ECReports object is generated by a single activation of an event cycle within an application level event ("ALE") engine. The contents of ECReports are defined by the event cycle specification (ECSpec) that defined the event cycle. Alternatively, or additionally, the information may be added in the form of EPC information services ("EPCIS") events. Such implementations provide additional benefits as compared to traditional online mechanisms for inventory management, which rely on a text string manually coded into the device, indicating its current location.

In the example depicted in FIG. 6A, the uplink is implemented via 802.11 technology, preferably using an extension of existing 802.11 location-based services. As used herein, the terms "802.11" and the like refer to a set of wireless local area network ("WLAN") standards developed by working group 11 of the IEEE Standards Committee (IEEE 802). The referenced standards include, but are not limited to, the original IEEE 802.11 standard, which is now sometimes called "802.11 legacy."

According to such methods, the existing 802.11 infrastructure of a warehouse, storage room, lab, data center, or other location can be used to collect inventory information. Using a modified version of an existing 802.11 infrastructure avoids the expense of installing separate RFID readers and related RFID devices. Moreover, existing 802.11-based asset location and tracking systems can be extended, if so desired, to include detailed inventory information.

In FIG. 6A, each of devices 605 includes an aggregation device 610 having an 802.11 uplink. Wireless access points 615 form communication links between the uplinks of aggregation devices 610 and other devices, including WLAN controller 620 and network device 625, via wired or wireless links. Network device 625 may comprise, for example, a switch or a router that is in communication with other devices via network 630, such as location server 635 and host device 640 of an inventory management system. The location server may be, e.g., a Cisco 2700 series location server.

Figure 6B:
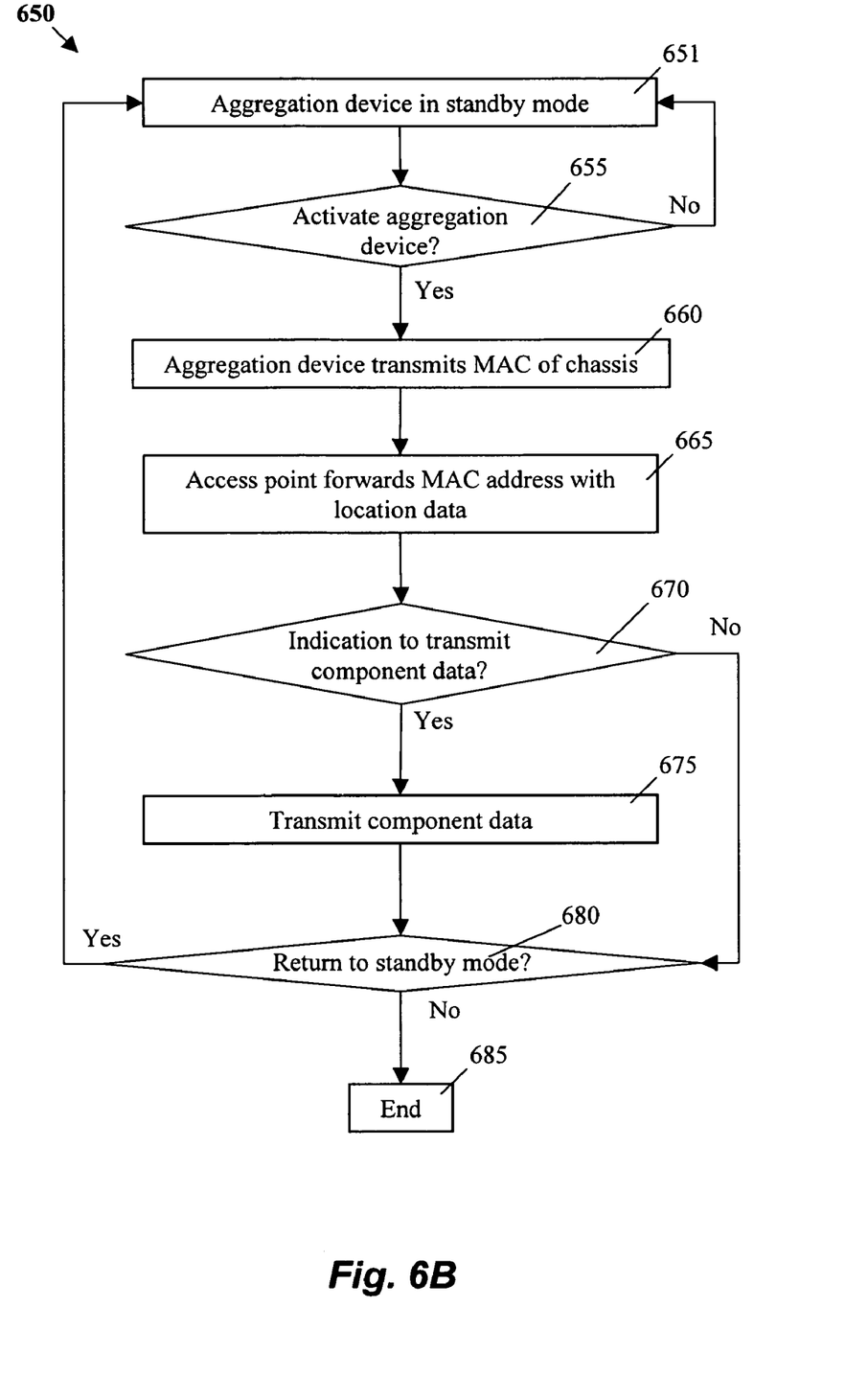
FIG. 6B is a flow chart that outlines a process that devices in the network of FIG. 6A may perform.

FIG. 6B illustrates one method 650 for networking aggregation devices 610 via 802.11 uplinks. In step 651, an aggregation device 610 is in a standby mode. At this stage, aggregation device 610 has already performed some method (e.g., as shown and described elsewhere herein) for obtaining, aggregating and storing component data. However, in some implementations, aggregation device 610 may nonetheless obtain and aggregate the component data after activation, in order to obtain the most recent version of the component data.

In this example, the uplink of an aggregation device 610 periodically becomes active. Here, the uplink becomes active according to an indication (e.g., by a timer of aggregation device 610) that a predetermined period of time has elapsed. However, in alternative implementations, the uplink of an aggregation device 610 becomes active in response to a signal from another device.

In step 660, the uplink transmits a media access control ("MAC") address of a chassis of corresponding device 605. (See signal 612.) In some implementations, the uplink includes location information, or other information from which a location may be determined, with the MAC address. However, in this example, the nearest access point 615 provides such location information. (Step 665.) Another device, such as WLAN controller 620, may provide related information, e.g., regarding the current location of the access point. Here, location server 635 is configured to receive the included location information, to translate and/or interpret the location information as needed and to provide human-readable and/or machine-readable location information to an inventory management system.

In FIG. 6A, only host device 640 of the inventory management system is shown. In practice, there may be many other devices associated with an inventory management system, including servers, storage devices, additional host devices, etc.

Instead of immediately returning to standby mode, in this example aggregation device 610 remains active for a predetermined length of time. If aggregation device 610 receives an indication to transmit component data within this predetermined length of time, aggregation device 610 may transmit these data. (Step 675.) For example, location server 635, a third party application server or host device and/or a device of an inventory management system may query aggregation device 610 for inventory information.

If security is a concern, aggregation device 610 may transmit one or more UIDs, which must be matched to a database to have meaning. In situations wherein higher-level security is desired, the uplink may be required to form an association with the access point before transmitting such information. Such association may include encryption capabilities.

If aggregation device 610 does not receive an indication to transmit component data within the predetermined length of time (or after transmission), aggregation device 610 may return to standby mode (as determined in step 680). Aggregation device 610 may make and store a record of the component data transmission and/or perform other functions, if indicated, before returning to standby mode.

As described elsewhere, aggregation devices 610 are preferably provided with battery backup systems that allow aggregation devices 610 to function when the other components of devices 605 are powered off. The capacity of the battery is preferably such that the devices 605 can be unpowered for a significant length of time (e.g., weeks, months or even years) and still be able to transmit aggregated inventory data.

Figure 7:
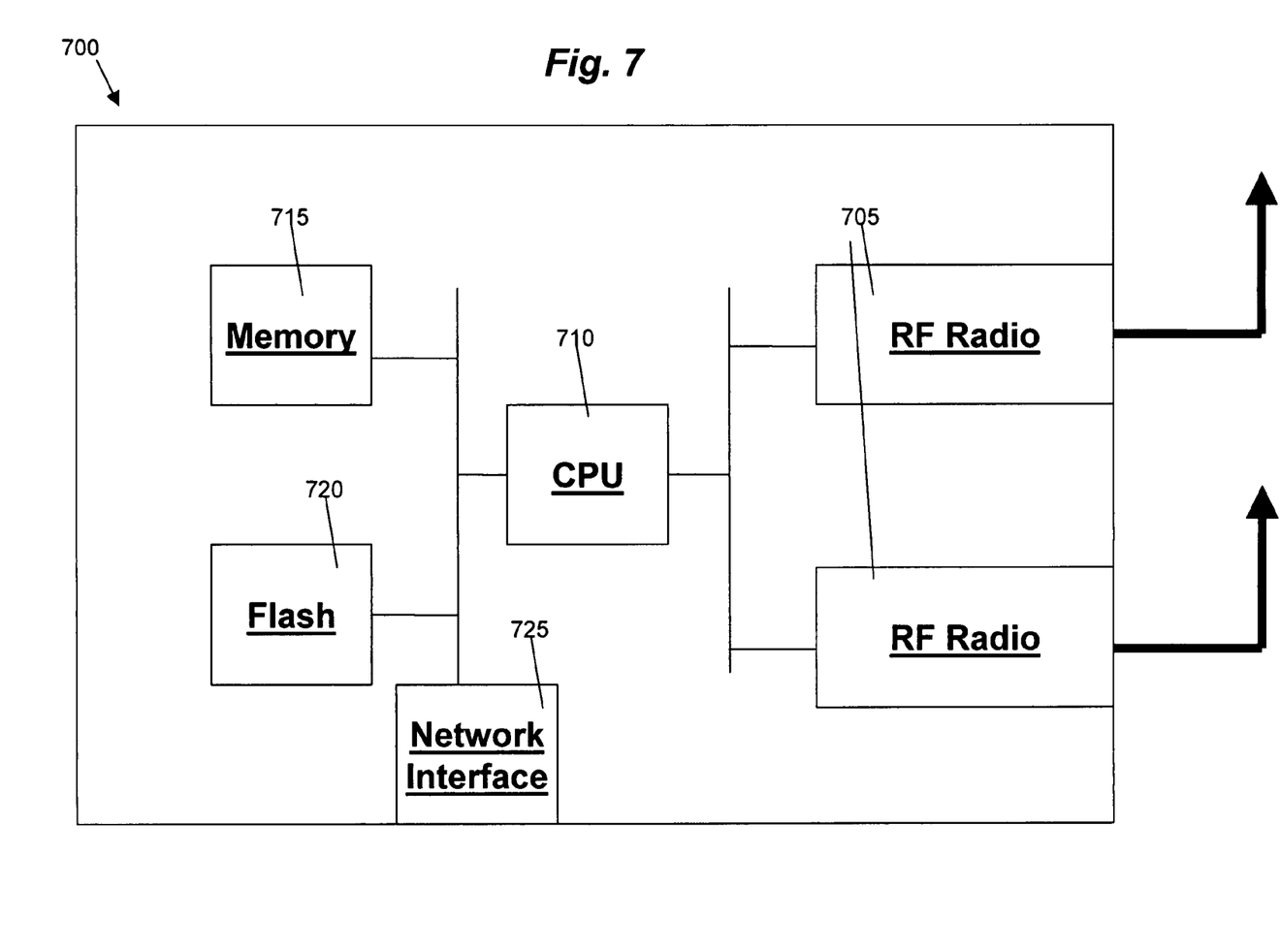
FIG. 7 is a block diagram of an RFID reader.

FIG. 7 illustrates an RFID reader that can be configured to perform methods of the present invention. RFID reader 700 includes one or more RF radios 705 for transmitting RF waves to, and receiving modulated RF waves from, RFID tags. RF radios 705 provide raw RF data that is converted by an analog-to-digital converter (not shown) and conveyed to other elements of RFID reader 700. In some embodiments, these data are stored, at least temporarily, by CPU 710 in memory 715 before being transmitted to other parts of an RFID network via network interface 725. Network interface 725 may be any convenient type of interface, such as an Ethernet interface.

Flash memory 720 is used to store a program (a "bootloader") for booting/initializing RFID reader 700. The bootloader, which is usually stored in a separate, partitioned area of flash memory 720, also allows RFID reader 700 to recover from a power loss, etc. In some embodiments of the invention, flash memory 720 includes instructions for controlling CPU 710 to form "DHCPDISCOVER" requests to initiate a provisioning/configuration cycle. In some implementations, flash memory 720 is used to store personality information and other configuration information obtained from, e.g., a DHCP server during such a cycle.

However, in preferred implementations, such information is only stored in volatile memory 715 after being received from, e.g. a DHCP server. There are advantages to keeping RFID devices "dumb." For example, a network of dumb RFID devices allows much of the processing load to be centralized, instead of being performed by the RFID devices. Alternatively, the processing load can be decentralized, but only to trusted devices.

Configuration information is downloaded from, e.g., a central server to memory 715. Updates may be instigated by the central server or selected, trusted devices. New versions of the image file (e.g., the running, base image necessary to operate the RFID device) are copied into flash memory 720. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 8:
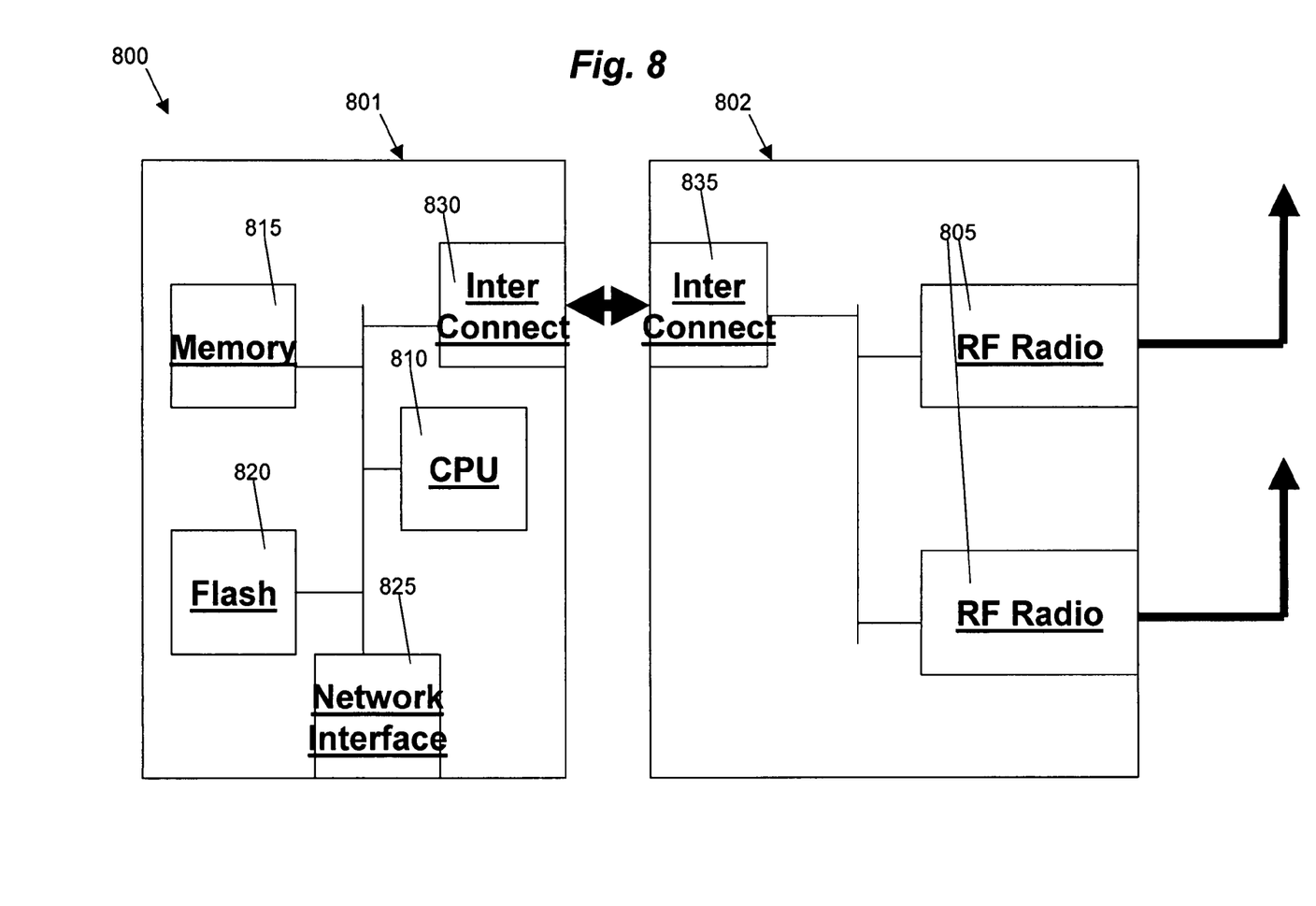
FIG. 8 is a block diagram of an RFID system.

FIG. 8 illustrates RFID system 900 that includes control portion 801 and RF radio portion 802. The components of control portion 801 are substantially similar to those described above with reference to FIG. 7. Interconnect 830 of control portion 801 is configured for communication with interconnect 835 of RF radio portion 802. The communication may be via any convenient medium and format, such as wireless, serial, point-to-point serial, etc. Although only one RF radio portion 802 is depicted in FIG. 8, each control portion 801 may control a plurality of RF radio portions 802. RFID system 800 may be deployed on a single framework or chassis (e.g., on a forklift) or in multiple chassis.

Other Embodiments

The methods of the present invention may be implemented, at least in part, by hardware and/or software. For example, some embodiments of the invention provide computer programs embodied in machine-readable media. The computer programs include instructions for controlling one or more devices to perform the methods described herein.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. An apparatus comprising:
a support structure, wherein the support structure comprises a device chassis;
means for communicating with a network, wherein the means for communicating with a network includes a network interface;
a plurality of components of a single network device disposed within the support structure, each of the plurality of components having an associated radio frequency identification ("RFID") tag; and
an RFID reader having a read range approximately corresponding with a volume of the support structure and configured to do the following:
read the RFID tag associated with each of the plurality of components;
aggregate component information from tag reads; and
transmit aggregated component information via the network interface;
wherein the RFID reader is disposed within the device chassis.

2. The apparatus of claim 1, further comprising a non-volatile memory, wherein the RFID reader is further configured to store component information in the non-volatile memory.

3. The apparatus of claim 1, wherein an operating frequency of the RFID tags is selected for short-range operation such that the read range is approximately corresponding with a volume of the support structure.

4. The apparatus of claim 1, wherein the RFID reader comprises an RFID aggregation tag.

5. The apparatus of claim 1, wherein the means for communicating with a network comprises a wireless interface.

6. The apparatus of claim 1, wherein the means for communicating with a network comprises an active or passive RFID tag.

7. The apparatus of claim 1, further comprising means for indicating whether one of the plurality of components of the network device was previously detected when the apparatus was powered on.

8. The apparatus of claim 1, wherein the support structure comprises a box.

9. The apparatus of claim 1, wherein the RFID reader is further configured to detect a configuration change and query each of the plurality of components when a configuration change is detected.

10. The apparatus of claim 1, wherein the read volume enables the RFID reader to read the RFID tag associated with each of the plurality of the components of the network device within the device chassis, but substantially prevents the RFID reader from reading RFID tags associated with components of another network device within another device chassis.

11. The apparatus of claim 1, further comprising:
means for determining whether one of the plurality of components have been removed from the device chassis.

12. The apparatus of claim 1, further comprising:
means for determining whether another component has been added to the device chassis.

13. The apparatus of claim 1, further comprising:
means for determining whether one of the plurality of components have been replaced with a different component.

14. The apparatus of claim 1, wherein an operating frequency or antenna gain of the RFID reader is selected for short-range operation such that the read range is approximately corresponding with a volume of the support structure.

15. An apparatus comprising:
a support structure, wherein the support structure comprises a device chassis;
a plurality of components of a single network device disposed within the support structure, each of the plurality of components having an associated radio frequency identification ("RFID") tag; and
an RFID reader having a read range approximately corresponding with a volume of the support structure and configured to do the following:

read the RFID tag associated with each of the plurality of components;
aggregate component information from tag reads; and
transmit aggregated component information;
wherein the RFID reader is disposed within the device chassis.

16. The apparatus of claim 15, further comprising a main power supply for powering the network device and a battery backup system, wherein the battery backup system is configured for powering the RFID reader when the main power supply is off.

17. The apparatus of claim 16, wherein the battery backup system is configured to recharge from the main power supply.

18. The apparatus of claim 15, further comprising a main power supply and a battery backup system for powering the RFID reader when other parts of the apparatus are powered down.

19. The apparatus of claim 18, wherein the battery backup system is configured to recharge from the main power supply.

20. The apparatus of claim 15, wherein an operating frequency of the RFID tags is selected for short-range operation such that the read range is approximately corresponding with a volume of the support structure.

21. The apparatus of claim 15, wherein an operating frequency or antenna gain of the RFID reader is selected for short-range operation such that the read range is approximately corresponding with a volume of the support structure.

22. The apparatus of claim 15, further comprising a processor and a memory configured to indicate whether one of the plurality of components of the network device was previously detected when the apparatus was powered on.

23. The apparatus of claim 15, wherein the RFID reader is further configured to detect a configuration change and query each of the plurality of components when a configuration change is detected.

24. The apparatus of claim 15, wherein the read volume enables the RFID reader to read the RFID tag associated with each of the plurality of the components of the network device within the device chassis, but substantially prevents the RFID reader from reading RFID tags associated with components of another network device within another device chassis.

25. The apparatus of claim 15, wherein the RFID reader comprises an RFID aggregation tag.

26. A method, comprising:
reading by a radio frequency identification (RFID) reader an RFID tag associated with each of a plurality of components of a single network device;
aggregating by the RFID reader component information obtained as a result of reading the RFID tag associated with each of the plurality of components to generate aggregated component information; and
transmitting by the RFID reader the aggregated component information;
wherein the RFID reader and the plurality of components of the single network device are disposed within a support structure, each of the plurality of components having an associated radio frequency identification ("RFID") tag;
wherein the RFID reader has a read range approximately corresponding with a volume of the support structure, wherein the support structure comprises a device chassis.

27. The method of claim 26, further comprising:
indicating whether one of the plurality of components of the network device was previously detected when the apparatus was powered on.

28. The method of claim 26, further comprising:
detecting a configuration change and querying each of the plurality of components when a configuration change is detected.

29. The method of claim 26, further comprising:
determining whether one of the plurality of components has been removed from the device chassis.

30. The method of claim 26, further comprising:
determining whether one of the plurality of components has been replaced with a different component.

31. A non-transitory computer-readable medium storing thereon computer-readable instructions, comprising:
instructions for reading by a radio frequency identification (RFID) reader an RFID) tag associated with each of a plurality of component of a single network device;
instructions for aggregating by the RFTD reader component information obtained as a result of reading the RFID tag associated with each of the plurality of components to generate aggregated component information; and
instructions for transmitting by the RFID reader the aggregated component information;
wherein the RFID reader and the plurality of components of the single network device are disposed within a support structure, each of the plurality of components having an associated radio frequency identification ("RFID") tag;
wherein the RFID reader has a read range approximately corresponding with a volume of the support structure, wherein the support structure comprises a device chassis.

32. The non-transitory computer-readable medium of claim 31, further comprising:
instructions for determining whether one of the plurality of components has been removed.

33. The non-transitory computer-readable medium of claim 31, further comprising:
instructions for determining whether one of the plurality of components has been added.

34. The non-transitory computer-readable medium of claim 31, further comprising:
instructions for determining whether one of the plurality of components has been replaced.

35. The non-transitory computer-readable medium of claim 31, further comprising:
instructions for indicating whether one of the plurality of components of the network device was previously detected when the apparatus was powered on.

36. The method of claim 26, further comprising:
determining whether another component bas been added to the device chassis.

* * * * *